No. 725,927. PATENTED APR. 21, 1903.
C. S. BRADLEY.
CANAL AND POWER GENERATING SYSTEM.
APPLICATION FILED OCT. 11, 1901.
NO MODEL.
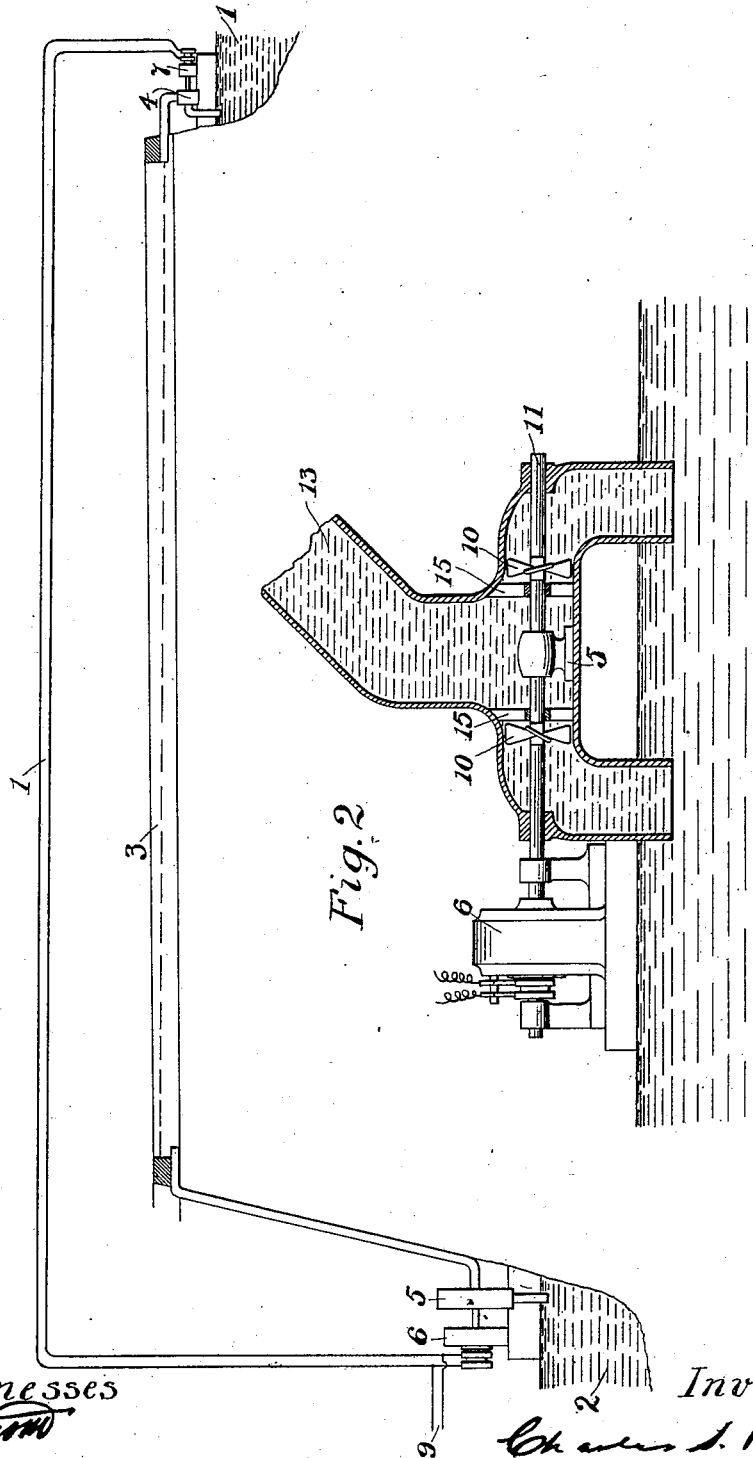

UNITED STATES PATENT OFFICE.

CHARLES S. BRADLEY, OF NEW YORK, N. Y.

CANAL AND POWER-GENERATING SYSTEM.

SPECIFICATION forming part of Letters Patent No. 725,927, dated April 21, 1903.

Application filed October 11, 1901. Serial No. 78,318. (No model.)

*To all whom it may concern:*

Be it known that I, CHARLES S. BRADLEY, a citizen of the United States, residing at New York, in the county and State of New York, have invented certain new and useful Improvements in Canals and Power-Generating Systems, of which the following is a specification.

This invention relates to improvements in canals and power-generating systems; and its object is to enable a canal to be supplied from a body of water located below the canal-level, while delivering water to a second body of water located below the first body of water, some of the power developed in this delivery being transmitted electrically to the intake end of the canal and used to pump from the source of supply, while the balance of the power so developed may be used for other purposes. By making the canal-level above the higher body of water considerable expense in excavating may be saved, enough in some cases to more than pay the cost of installation of the electric transmission and pumping system proposed. The canal may of course be used for transportation purposes or may be used only for the generation of power.

In the accompanying drawings, Figure 1 is a diagrammatic representation of a canal embodying my invention. Fig. 2 represents one of the electrohydraulic elements at either end of the canal—for example, the dynamo and its operating-turbine.

The higher body of water 1 is connected to the lower body 2 by the canal 3, whose level is above both of them. A pump 4 forces water from 1 into the canal, and a turbine or hydraulic motor 5 is connected to the intake leading from the other end of canal 4 to the body of water 2, so as to generate power due to the fall of this water. A portion at least of the mechanical energy so developed by motor 5 is converted into electric energy by a dynamo 6 and transmitted by wires 7 back to an electric motor 8 at the intake end of the canal and connected to drive the pump 4. If the canal is intended for traffic, it will have the usual means for transfer of vessels to and from the canal, such means being preferably of the "lift" variety as distinguished from locks; but in general the canal would be used also for power generation, it being so located that the fall at 2 would be sufficiently greater than the rise at 1 to deliver a large excess of power at 2, which would be utilized in any suitable way, as by being delivered through transmission means 9 to any suitable point.

On account of the large volume of water to be passed at each end and the desirability of a specially high-speed device both for pumping and as a turbine I prefer to use the hydrodynamic device shown in Fig. 2, consisting of a device in the nature of a propeller, which on being rotated will by its inclined blades force the water transversely to the motion of said blades or will generate power due to motion of the water in such direction. When this device is used as a turbine, by so connecting it to the load that its blades will revolve at a sufficient speed to keep back the water in the flume and only allow of a small percentage of the velocity—say ten per cent.— that would be developed if the blades were removed the device becomes practically a pressure-engine, and its power may be calculated by multiplying the pressure per unit of area by the area of the vanes (allowing for the pitch of same) and the speed of the vanes. In the ordinary turbine pressure due to head produces a certain velocity, and the function of the turbine is to receive this water traveling at high velocity and move backward at such rate that the velocity will be mostly destroyed, a corresponding amount of mechanical energy being developed, the peripheral velocity of the turbine being somewhat less than one-half of the velocity of the intake-water. In the propeller-blade turbine as the pitch of the blades will be less than forty-five degrees the velocity of the periphery will be much greater than the water velocity, and the water will leave the turbine at substantially the same speed at which it enters it, but with most of its pressure removed, due to the obstruction presented by the revolving blades. The advantage of this propeller-turbine is that its high speed enables coöperation with high-speed electric apparatus of greater simplicity and cheapness and also gives a much greater delivery of water for a given size of turbine. It is also cheaper, lighter, and less liable to injury than the ordinary turbine. Moreover, it is strictly reversible, being applicable either as a motor or as a pump.

Referring to Fig. 2, the device, which may be assumed to be acting as a turbine, comprises two sets of vanes or propeller-blades 10, mounted on a shaft 11 on opposite sides of the intake 19 and with a tail-race leading from the outer side of each. The vanes are oppositely directed, so as to produce rotative action in the same direction by the pressure of the water between them. The shaft 11 is connected to a load, such as dynamo 6, which allows it to rotate at sufficient speed to prevent the water in the flume from attaining more than a small percentage—say ten per cent.—of the speed which would naturally be due to its head. Consequently nearly the full pressure or head exists on the inner side of the vanes, while on the outer side there is practically no pressure at all. There will thus result a pressure on the vanes of which the axial components will balance and the transverse components will combine to give a rotative effect on the shaft. Fixed guide-blades 15, extending across the casing in proximity to the moving vanes, prevent the water from taking up a whirling motion, these blades being parallel to the shaft 11. The special construction of this hydrodynamic device is not herein claimed, and I reserve the right to file a subsequent application thereon.

Instead of using this device as a turbine or motor I may use any usual turbine and motor devices at the ends of the canal.

Having thus described my invention, the following is what I claim as new therein and desire to secure by Letters Patent:

1. A hydraulic system comprising a canal connecting two bodies of water at different levels but both located below the canal-level, a pump supplying water from the higher body to the canal, a hydraulic motive device delivering water from the canal to the lower body of water and an electric transmission system operating said pump from said motive device.

2. A hydraulic system comprising a canal connecting two bodies of water at different levels but both located below the canal-level, a pump supplying water from the higher body to the canal, a hydraulic motive device delivering water from the canal to the lower body of water and an electric transmission system including an electric generator operated by said motive device, and an electric distributing-circuit from said generator including an electric driving device for said pump.

CHARLES S. BRADLEY.

Witnesses:
  A. P. KNIGHT,
  J. GREEN.